May 7, 1957 W. J. MORRILL 2,791,121
MECHANICAL MOVEMENT DEVICE
Filed May 18, 1950 4 Sheets-Sheet 1

INVENTOR.
WAYNE J. MORRILL
BY

May 7, 1957  W. J. MORRILL  2,791,121
MECHANICAL MOVEMENT DEVICE
Filed May 18, 1950  4 Sheets-Sheet 3
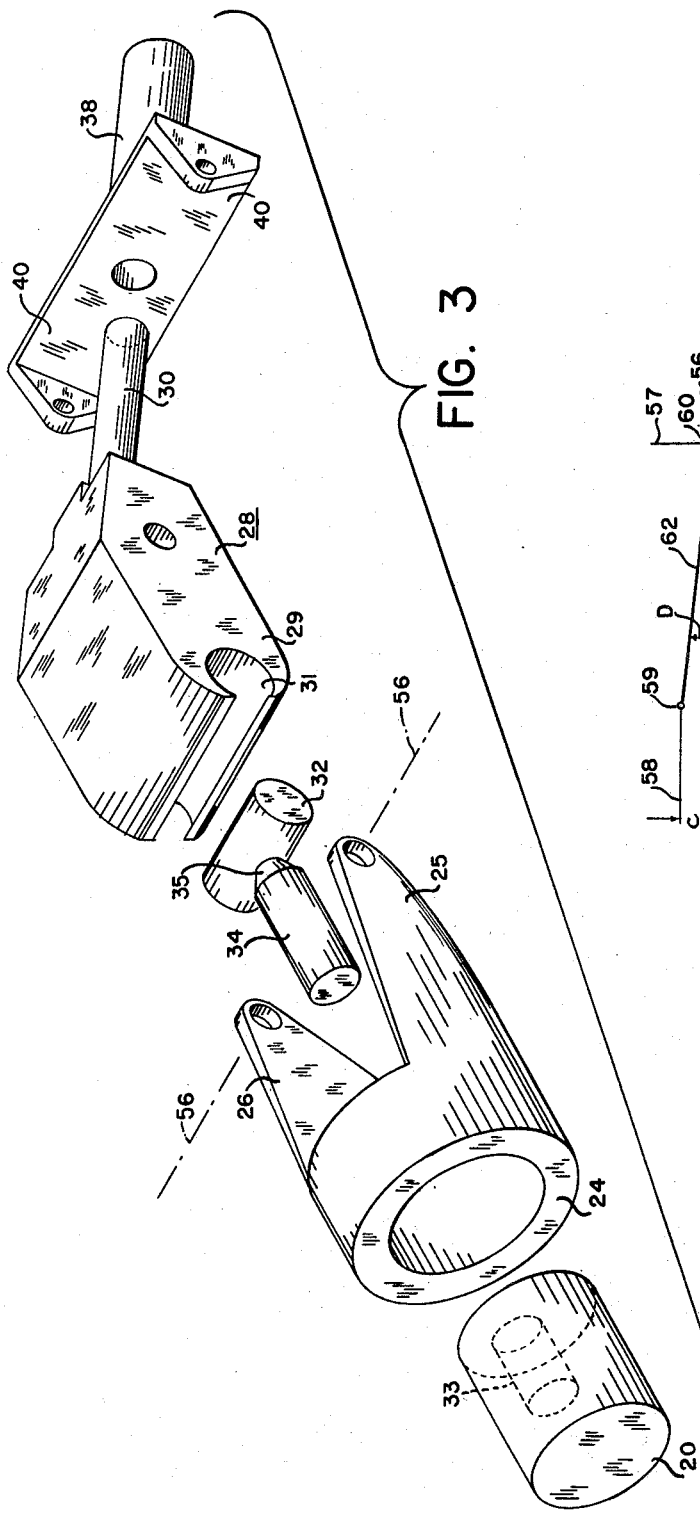
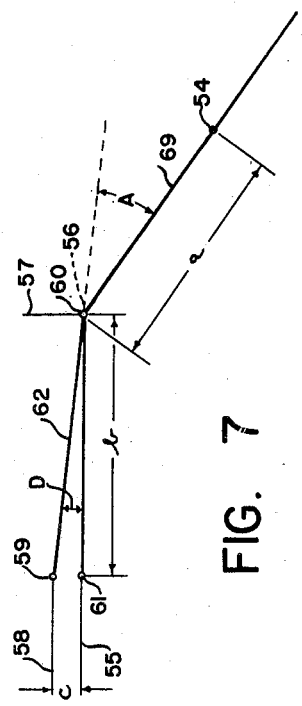
INVENTOR.
WAYNE J. MORRILL May 7, 1957 W. J. MORRILL 2,791,121
MECHANICAL MOVEMENT DEVICE
Filed May 18, 1950 4 Sheets-Sheet 4

INVENTOR.
WAYNE J. MORRILL
BY
Woodling and Krost
attys.

United States Patent Office 2,791,121
Patented May 7, 1957

2,791,121

MECHANICAL MOVEMENT DEVICE

Wayne J. Morrill, Garrett, Ind.

Application May 18, 1950, Serial No. 162,662

26 Claims. (Cl. 74—23)

The invention relates in general to mechanical movement devices and more particularly to such devices incorporated into a coil winding machine.

An object of the invention is to provide a machine for winding the electrical coils of a dynamoelectric machine and more particularly the stator thereof. In the present development of the stator or primary winding of an induction motor the tendency is toward a pole structure on this stator which has a large area of magnetic material adjacent the inner cylindrical periphery of the stator to coact with the rotor, and yet to have a large volumetric capacity in the stator for the coil. To achieve this end some pole structure having other than straight-sided slots must be used, or in other words the slots have a narrow frontal opening and have an enlarged area behind this small frontal opening. Such a stator construction may be that as shown in my copending application Serial No. 767,816, filed August 9, 1947, now Patent No. 2,485,628. It will be clear that the typical method of forming a coil on a mandrel and then forcing it into the straight-sided coil slot can no longer be used for this new type of stator construction and some device which will actually wind the coil upon the stator itself rather than upon a coil form must be used. The present invention is directed to such a mechanical movement device for winding an electrical coil directly upon a stator of a dynamoelectric machine.

It is, therefore, a further object of my invention to provide a coil winding machine wherein an element or arm of the machine moves in a closed loop to circumscribe a pole structure.

Another object of the invention is to provide a mechanical movement device wherein a tube or other wire guide may move in a closed path about a pole structure of a stator or a dynamoelectric machine wherein the pole structure is closely adjacent other pole structures on either side thereof, so that the wire guide tube need move substantially in a plane so as to go between these closely adjacent pole pieces.

Another object of the invention is to provide a coil winding machine for a stator which has a pole piece at least partially defined by two narrow slots and wherein the wire guide of the winding machine moves in a closed path about the pole piece which closed path has substantially opposite substantially straight sides to pass through the narrow slots.

A further object of the invention is to provide in a coil winding machine as described above that the closed path is based upon a circular movement which is distorted into something approaching an elliptical shape wherein portions of the sides of the ellipse are substantially straight.

A still further object of the invention as described immediately above is to provide that the closed path is initially based upon a conical movement such that a point on the cone describes a circular path in a plane perpendicular to the axis of the cone and then this conical movement is flattened on the sides such that the path is distorted from its circular shape and lies other than in a single plane.

Another object of the invention in the structure described immediately above is to provide an angle arm rotating about an axis at an acute angle thereto to generate a conical movement and further to partially pivot or oscillate the angle arm about a second axis perpendicular to the first axis and intersecting same at the apex of the cone such that a point on the angle arm describes a closed path on the surface of a reference sphere which has the intersection of the two axes as the center thereof. Further, this closed path on the spherical surface may additionally be transformed into a closed path on a cylindrical surface through suitable linkage means which utilize the angular twisting movements in the plane of the two axes and utilize the translation in a direction perpendicular to this plane to achieve a cylindrical movement based upon a cylinder having its axis perpendicular to this plane.

Other objects and a fuller understanding of the invention may be had by referring to the following description and claims, taken in conjunction with the accompanying drawings, in which:

Figure 3 is an isometric exploded view of the contra-rotating shafts which rotate and oscillate the angle arm to twist and reciprocate the yoke and gimbal rings;

Figure 7 is a side view of the relationship of the axes of the various parts in the machine.

Figure 1:
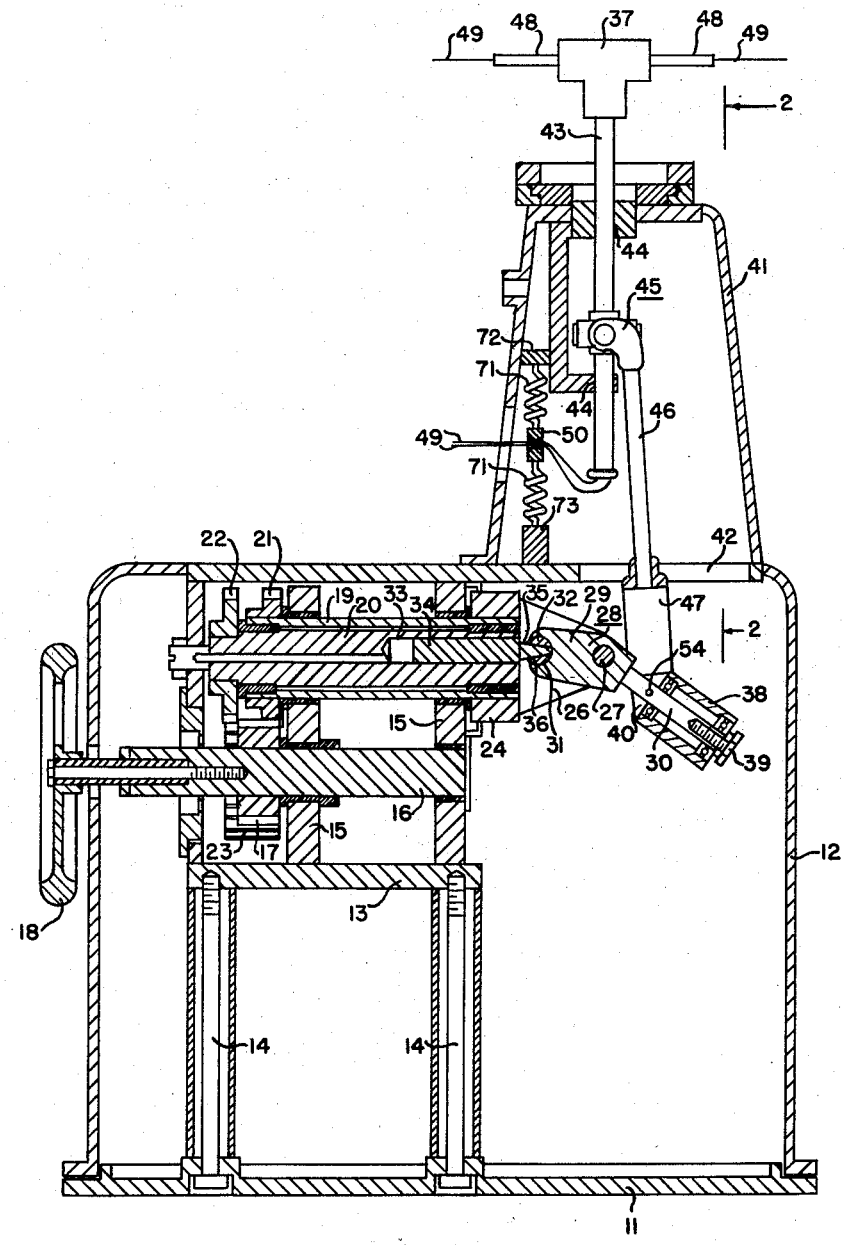
Figure 1 is a sectional side view of a coil winding machine embodying the principles of my invention.
Figure 2:
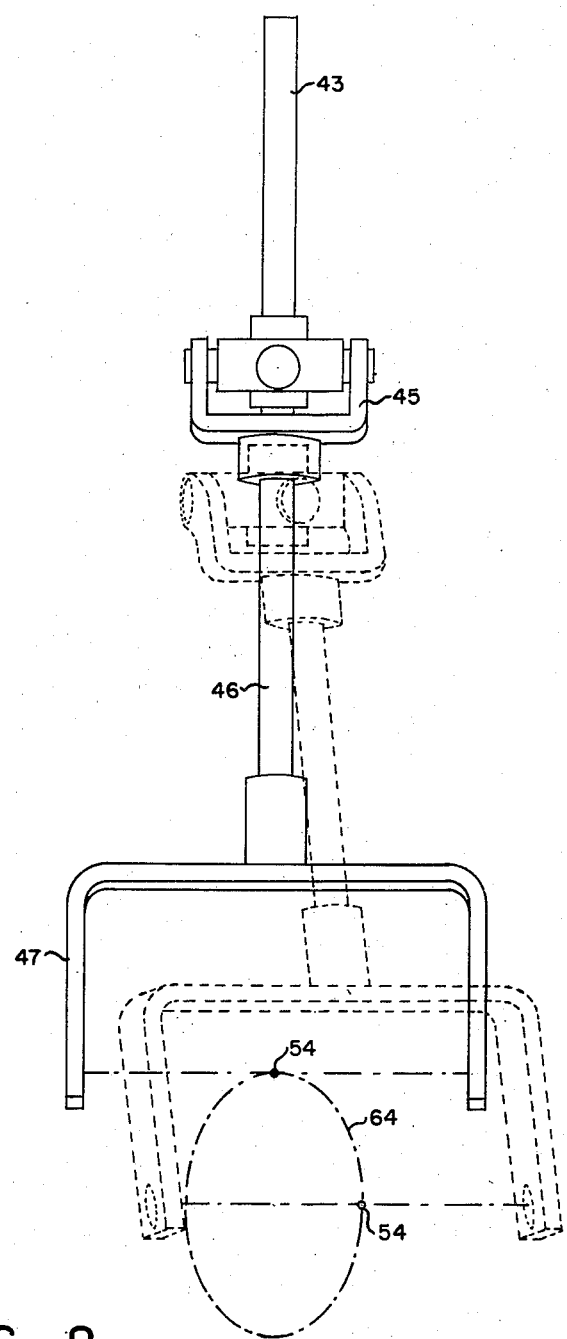
Figure 2 is a front elevational view of part of the machine taken along the line 2—2 of Figure 1 to an enlarged scale and showing more in detail the movement and structure of the yoke and gimbal rings.

The preferred embodiment as shown in Figures 1, 2 and 3 has a base plate 11 which carries a housing 12. A bed 13 is supported from the base plate 11 in any suitable manner such as by the bolts 14 and this bed 13 carries bearing supports 15. A first drive shaft 16 is journaled in the bearing supports 15, and this drive shaft carries a gear 17 fixedly fastened thereto. The first drive shaft 16 may be rotated by a handwheel 18 and optionally the drive shaft 16 may be power driven by any suitable means, not shown.

The bearing supports 15 additionally journal a sleeve shaft 19 which in turn concentrically journals an inner shaft 20. The gear 17 meshes with and drives a gear 21 fastened to the sleeve shaft 19 and also this gear 17 drives a gear 22 fastened to the inner shaft 20 through the intermediary of an idler gear 23. This idler gear 23 may also be journaled in any suitable manner, such as on the bearing supports 15. The gears 21 and 22 are of the same diameter such that the sleeve shaft 19 and inner shaft 20 rotate at the same speed but in opposite directions. The sleeve shaft 19 a collar 24 fastened thereto external of the bearing supports 15 and this collar 24 carries two longitudinally extending arms 25 and 26. The outer ends of the arms 25 and 26 are drilled to receive an axle 27 which axle has an axis intersecting the axis of the shafts 19 and 20 and perpendicular thereto. An angle arm 28 is pivotally carried by the axle 27. The angle arm 28 has a yoke end 29 and a driver end 30. The yoke end 29 of the angle arm 28 has a wall defining a partially cylindrical bore 31 parallel to the axle 27. A cylinder 32 is translatable within the bore 31 which translation is parallel to the axle 27. An eccentric bore 33 is provided longitudinally in the inner shaft 20 to receive an eccentric pin 34, and a reduced end 35 of the pin 34 fits within a corresponding recess 36 in the cylinder 32, and is riveted thereto. The driver end 30 of the angle arm 28 is preferably cylindrical and carries a bearing 38 which may be longitudinally adjusted on the driver end 30 by the screw 39. The bearing 38 has wings 40 which extend transversely of the driver end 30.

A secondary housing 41 is carried on the upper portion of the lower housing 12, and an aperture 42 in this lower housing 12 provides communication between the interiors of the two housings. A hollow rod 43 is carried in bearings 44 in the housing 41 and these bearings 44 permit rotational movement as well as translation of the rod 43. Pivotal connection means 45 is fastened to and carried by the hollow rod 43 and this pivotal connection means 45 is shown in the preferred embodiment as gimbal rings having the two axes thereof normally horizontal. A secondary rod 46 is fastened to the gimbal rings 45 and carries at the lower end thereof a yoke 47 which pivotally connects to the wings 40 of the bearing 38. The gimbal rings 45 induce a twisting movement in the hollow rod 43 in direct accordance with the angular swing in a horizontal plane of the angle arm 28 and also cause translation of this hollow rod in a vertical path in direct accordance with up-and-down movements of a point 54 on the driver end 30 of this angle arm 28. Wire guides 48 in this preferred embodiment are shown as flattened hollow tubes carried by a T 37 at the upper end of the hollow rod 43 with the interiors of these two tubular members 48 in communication with and perpendicular to the hollow rod 43. The T 37 may include therein a level-wind mechanism to slowly longitudinally reciprocate the tubes 48 in and out of the T as the wire is wound around a pole.

The wire guide 48 is double ended to permit winding two diametrically opposed coils in the stator at one time and the axis of the stator, not shown, would be vertical. Any suitable means may be used to supply wires 49 to the two ends of the wire guide 48. The wires 49 may be obtained from spools, not shown, mounted in any suitable manner, such as on the top of the lower housing 12. The wires 49 may be fed through an eye 50. The eye 50 is held by dancing springs 71 from the brackets 72 and 73 to one side of the hollow rod 43 at about the midpoint of vertical travel of the lower end of this rod 43.

In operation the coil winding machine is driven by any suitable means such as by the handwheel 18 to contrarotate the sleeve and inner shafts 19 and 20 at the same speeds of rotation. The sleeve shaft 19 rotates the collar 24 and the arms 25 and 26 to tumble the axle 27 end for end. This axle 27 will thus revolve in a plane parallel to the plane of the view of Figure 2. At the same time the rotation of the inner shaft 20 causes rotation of the eccentric end portion 35 which in turn effects a partial pivotal movement or oscillation of the yoke end 29 of the angle arm 28. The Figure 7, which shows the side view of the axes of the various parts, may be referred to as an aid in understanding the complex movements of this angle arm 28. The first axis 55 is the axis of both the sleeve and inner shafts 19 and 20. A second axis 56, shown in this Figure 7 as a point, which represents the end view thereof, is the axis of the axle 27. A third axis 57 is the axis of the hollow rod 43. These first, second and third axes intersect at a common point 60 in this preferred embodiment. An eccentric axis 58 is the axis of the eccentric pin 34. The point 59 shown in Figure 7 is the intersection of the eccentric axis 58 and a center line 62 of the yoke end 29 which center line 62 extends between the common point 60 and the geometric center of the intersection of the axes of the cylinder 32 and recess 36. Point 61 is a point on the axis 55 and vertically below the point 59, and point 54 is the intersection of axis 69 of driver end 30 with the axis of pivotal connection of the wings 40 and yoke 47. Considering only the movement imparted to the angle arm 28 by the sleeve shaft 19 the axis 69 of the driver end 30 would generate a conical movement having the intersection 60 of the axes 55 and 56 of the shaft 19 and axle 27 as the apex of this cone. The point 54 on the driver end 30 would thus generate a circular path in a plane perpendicular to the axis 55 of the sleeve shaft 19. This point 54 has been chosen as the intersection of the axis of the secondary rod 46 and the axis 69 of the driver end 30. Now when one considers only the movement of the angle arm 28 as imparted by the eccentric pin 34 it will be seen that this eccentric movement causes a partially pivotal or oscillating movement of the yoke end 29, and hence the driver end 30, of the angle arm 28 about the axle 27. Since the eccentric pin 34 is connected to the yoke end 29 by the sliding cylinder 32 it will be seen, during certain locations of the relative movement between the inner shaft 20 and sleeve shaft 19, that this eccentric imparts no changed angle, either plus or minus, to the angle of the angle arm 28. Now when we consider the combined movement of the sleeve and inner shafts 19 and 20 upon the angle arm 28, it will be seen that the eccentric pin 34 distorts this conical movement and flattens out the sides thereof by constricting these sides while the upper and lower portions of this cone are distended. The flattened portions of the cone are substantially contained in planes which pass through the apex 60 of the cone and which are vertical planes for the machine described. It further will be seen that the circular path of the point 54 has likewise been distorted so that it is no longer circular; rather, it is generally elliptical in shape with flattened sides, however, this closed path generated by the point 54 remains on the surface of a reference sphere having the center thereof as the apex of the cone or the common point 60.

Figure 4:
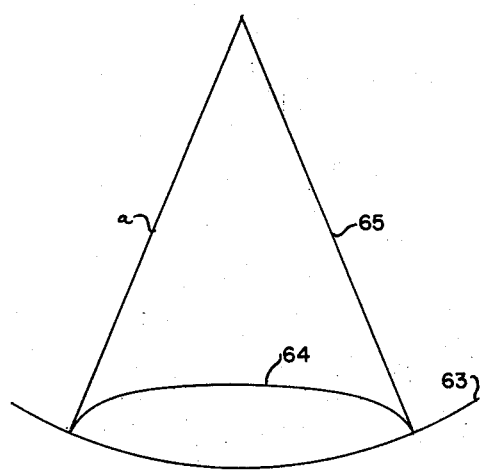
Figures 4, 5 and 6 are top, front and side views, respectively, of the closed path taken by a point on the angle arm with this closed path being on the surface of a reference sphere.
Figure 5:
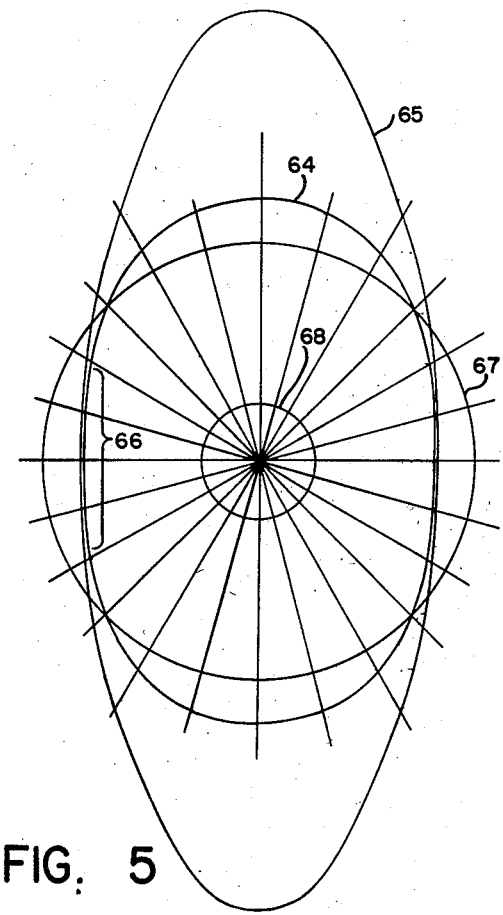
Figure 6:
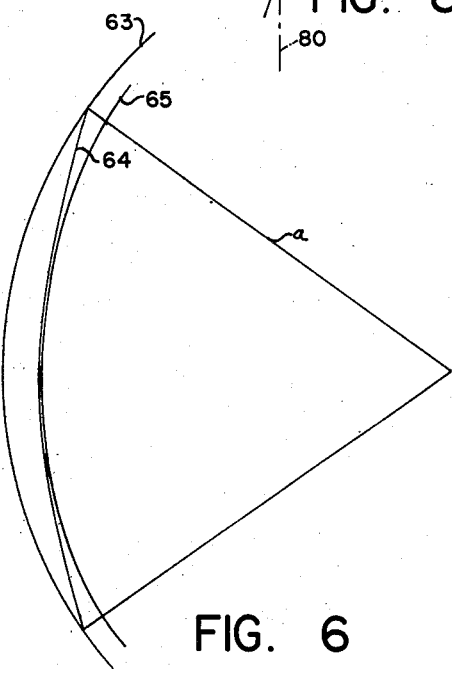

In the Figure 7 the ratio of the distances between the points 56 and 61 and the points 59 and 61 determines an angle D which is a small angle defining the maximum oscillatory or partially pivotal movement of the yoke end 29. The angle A denote an acute angle between the axis 69 of the driver arm 30 and an extension of the center line 62 of the yoke end 29. The horizontal distance between the points 60 and 61 is designated as $b$, the distance between the eccentric axis 58 and the first axis 55 is designated as $c$, and the distance between the points 54 and 60 is designated as $a$. The present structure has been designed to wind a coil having an arcuate swing of 45 degrees which shall be designated as the angle B. Further, it is desired that the wire guides 48 move in a straight line through the entire length of the slots between the pole pieces of a stator, and this straight-line movement may be chosen any length and shall be designated as $d$. In the present structure this distance $d$ has been chosen as approximately .75 of an inch. The ratio of $c$ to $b$ determines the angle D and the ratio of the angles D to A determines the shape of the closed path generated by the point 54. This closed path is shown in the three views of Figures 4, 5 and 6. Since this closed path occurs on the surface of a reference sphere, it is geometrically impossible to develop a true pictorial representation of this path upon a flat plane such as the patent drawing sheets; however, the Figures 4, 5 and 6 are a close approximation to a true representation of the top, front and side views of this closed path. These Figures 4, 5 and 6 are to twice scale of the actual machine with Figure 7 to full scale, Figure 2 to half scale and Figure 1 to one-quarter scale. In these Figures 4, 5 and 6, $a$ is shown as being the radius of a reference sphere 63 upon the surface of which moves the point 54. The closed path generated by the point 54 is designated in these three views by the reference character 64. Also shown in these three views is a great circle 65 produced by a diametral plane. The purpose of the great circle 65 is to show that a portion approximately 35 to 40 percent of the total vertical travel of the closed path 64 lies substantially within a diametral plane, in this case, the plane of the great circle 65. It will be noted that between the 60-degree and 120-degree radials the closed path 64 and the great circle 65 are substantially coincident. For aid in understanding the drawing, especially the Figure 5, this great circle 65 has been made at a slightly different angle than the greatest angularity in a horizontal plane of the driver end 30 during its closed path, so that the two lines 64 and 65 do not fall one upon the other. In referring to Figure 7 it has been found that for an angular swing of 45 degrees, an angle A in the order of 64 percent of this angle B and an angle D in the order of 14 percent of this angle B will produce the substantially straight portions 66 as shown in Figure 5. To achieve this straight portion 66 over a length of approximately .75 of an inch it has been found that the distance $a$ should be in the order of $$\frac{1.4d}{\sin .78B}$$

where B is 45 degrees.

This closed path 64 which is on the surface of a reference sphere may be used directly to wind the coils on a stator of a dynamoelectric machine; however, it has been found more convenient to change this spherical movement into a cylindrical movement. As best shown in Figure 1, by this change to a cylindrical movement only the guide rod 48, the T 37 and part of the hollow rod 43 need be within the stator, whereas if the spherical movement were to be used directly to wind the coils upon the stator such as by a wire guide at the point 54, there would be considerably more mechanism in the opening of the stator. This spherical movement is transformed into the cylindrical movement by the secondary rod 46, the hollow rod 43, the yoke 47 and gimbal rings 45. The gimbal rings 45 have been provided only because of possible manufacturing tolerances and actually gimbal rings or its equivalent with two pivotal axes are not required. Since the first, second and third axes 55, 56 and 57 and the axis 54 all intersect at the common point 60, the secondary rod 46 will always lie in a vertical plane and hence only the axis of the gimbal rings lying in the plane of Figure 2 is required. Referring once more to Figure 1, it will be seen that the secondary rod 46 slightly pivots about the axle of the gimbal ring which is parallel to the plane of Figure 2 but that this pivotal movement is very slight, and hence does not materially affect the cylindrical movement. For this reason, the path generated by a point at the end of the wire guide 48 would be very similar to the path 64 shown in Figures 4, 5 and 6, and would differ from these views by showing a reference cylinder rather than a reference sphere. Also, in views similar to those of Figures 5 and 6, the straight portions 66 would actually be shown as straight lines, rather than as slightly curved lines.

In Figure 5 a circle 67 has been shown which designates the basic circular path that would be generated by the point 54 if the yoke end 29 of the angle arm 28 were not eccentrically mounted. Further, this Figure 5 shows a small circle 68 which designates the path of movement of the eccentric axis 58 of the eccentric pin 34. The combination of these two circles 67 and 68 will result in the closed path 64.

It has previously been stated that the first, second and third axes 55, 56 and 57 are mutually perpendicular and intersect at the common point 60. It is not absolutely essential that the third axis 57 intersect this common point since if it did not the only change would be in the amount of angular swing of the wire guide 48 relative to the amount of angular swing in a horizontal plane of the driver end 30. Under certain circumstances this might be valuable to effect such a change between these two angular swings in the horizontal plane. Still further, it is not absolutely essential that the first and second axes 55 and 56 intersect at the apex of the cone generated by the axis 54 of the driver end 30. If this apex of the cone were at some point other than at this common point 60, or the third axis 57 did not intersect this common point 60, then the secondary rod 46 would move other than in a vertical plane, and hence both axes of the gimbal rings 45 would be called into play.

Figure 8:
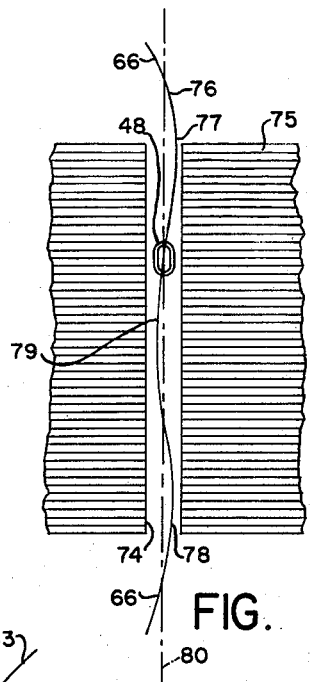
Figure 8 is a front view of a wire guide and the exaggerated path thereof passing through the slot in a stator.

The Figure 8 is a front view of the end of the wire guide 48 as it passes on a path 76 through a slot 74 in a stator 75. The path 76 has been chosen as greatly exaggerated in side swing. The straight portion 66 extends slightly above and below the stator 75. The action of the eccentric pin 34 produces the appearance of a third harmonic motion, since to obtain the straightest possible motion, the angles D and A are so proportioned to create slight nodal points 77 and 78 and an antinode 79 relative to a straight line 80. In the machine actually constructed, this slight deviation was held to about .002 inch over the entire straight portion 66.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A mechanical movement device, comprising an arm, means for rotating said arm about an axis to generate a conical movement such that a point on said arm describes a circular path on a reference sphere in a plane perpendicular to said axis, rotative means acting on said arm to distort said cone such that at least a portion of said path is substantially contained within a diametral plane of said sphere, and a link connected to said arm at said arm at said point to transform said portion of the curved path into a substantially straight line.

2. A mechanical movement device comprising an axle having an axis, an arm having a second axis perpendicular to said first axis and at least partially pivotable about said axle, means for rotating said axle in a plane containing said first axis and at an acute angle to said second axis, and eccentric means operating at substantially the same rotational speed as said first means and having an axis substantially perpendicular to said plane to partially pivot said arm about said first axis.

3. A mechanical movement device comprising an axle having an axis, an arm having a second axis perpendicular to said first axis and at least partially pivotable about said axle, means for rotating said axle in a plane containing said first axis and at an acute angle to said second axis such that a point on said arm generates a closed path on a reference sphere having the center thereof at the intersection of said axes, and linkage means including gimbal rings to transform said spherical path into a cylindrical path based upon a cylinder having its axis substantially perpendicular to the two axes of the gimbal rings and passing through the center of said sphere.

4. A mechanical movement device comprising an axle having an axis, an arm having a second axis perpendicular to said first axis and at least partially pivotable about said axle, means for rotating said axle in a plane containing said first axis at an acute angle to said second axis, eccentric means synchronized with said first means to cyclically and partially pivot said arm about said first axis such that a point on said arm generates a closed path on a reference sphere having the center thereof at the intersection of said axes which path is in other than a single plane, and linkage means including gimbal rings to transform said spherical path into a cylindrical path based upon a cylinder having its axis substantially perpendicular to the two axes of the gimbal rings and passing through the center of said sphere.

5. A mechanical movement device comprising an axle having an axis, an arm having a second axis perpendicular to said first axis and at least partially pivotable about said axle, means for rotating said axle in a plane containing said first axis and at an acute angle to said second axis such that a point on said arm generates a circular path on a reference sphere having the center thereof at the intersection of said axes which path is in a second plane, eccentric means synchronized with said first means and rotating in the opposite direction to cyclically and partially pivot said arm about said first axis such that said circular path is distorted to have two substantially opposite portions which are substantially contained in diametral planes of said sphere and with said path remaining on said sphere, linkage means including pivotal means to transform said spehrical path into a cylindrical path based upon a cylinder having its axis substantially perpendicular to the axis of said pivotal means and passing through the center of said sphere, and a T bar substantially perpendicular to the axis of said cylinder to emphasize said cylindrical movement.

6. A mechanical movement device comprising a revoluble first member rotatable about a first axis in a first direction at a given speed, a revoluble second member coaxially disposed relative to said first member and rotatable in the opposite direction at said given speed, angle arm means having a driver arm at an acute angle to said axis and having a pivot axis at an angle to said first axis, means for rotating said angle arm means from said first member about said first axis, and an eccentric carried by said second member adapted to engage said angle arm means, said eccentric being displaced from said member axes to effect partial rotation of said angle arm means about said pivot.

7. A mechanical movement device comprising a revoluble first member rotatable about a first axis in a first direction at a given speed, a revoluble second member coaxially disposed relative to said first member and rotatable in the opposite direction at said given speed, angle arm means having a driver arm at an acute angle to said axis and having a pivot axis perpendicular to said first axis, means for rotating said angle arm means from said first member about said first axis, an eccentric carried by said second member adapted to engage said angle arm means, said eccentric being displaced from said member axes to effect partial rotation of said angle arm means about said pivot, a first rod having a first end movable by said angle arm means in a closed path on the surface of a reference sphere with the intersection of said pivot and member axes as the center of said sphere, said first rod being disposed generally perpendicular to said member axes, a second rod having an end and being disposed substantially perpendicular to said member axes, pivotal means interconnecting a second end of said first rod and said second rod to transform said spherical movement into a cylindrical movement, and a T bar carried by said second rod substantially perpendicular thereto whereby one end of said T bar will produce a movement on the peripheral surface of a cylinder which movement is a closed path having opposite sides which are substantially parallel to the axis of the cylinder for a distance at least 25 percent of the axial length of said closed path.

8. A mechanical movement device comprising a revoluble shaft, angle arm means having a driver arm and a pivot axis perpendicular to said shaft axis, means for rotating said angle arm means from said shaft about the axis of said shaft, a first rod having a first end movable by said driver arm in a closed path on the surface of a reference sphere with the intersection of said pivot and shaft axes as the center of said sphere, said first rod being disposed generally perpendicular to said shaft axis, a second rod disposed substantially perpendicualr to said shaft axis and in the plane of said pivot, and pivotal means interconnecting a second end of said first rod and said second rod to transform said spherical movement into a cylindrical movement.

9. A mechanical movement device comprising a revoluble shaft, angle arm means having a driver arm and a pivot axis perpendicular to said shaft axis, means for rotating said angle arm means from said shaft about the axis of said shaft, a first rod having a first end movable by said driver arm in a closed path on the surface of a reference sphere with the intersection of said pivot and shaft axes as the center of said sphere, said first rod being disposed generally perpendicular to said shaft axis, a second rod having an end and being disposed substantially perpendicular to said shaft axis and in the plane of said pivot, pivotal means interconnecting a second end of said first rod and said second rod to transform said spherical movement into a cylindrical movement, and a T bar carried by said end of said second rod substantially perpendicular thereto whereby one end of said T bar will produce a movement on the peripheral surface of a cylinder.

10. A mechanical movement device comprising a revoluble hollow shaft rotatable in a first direction at a given speed, an inner shaft concentrically disposed within said hollow shaft and rotatable in the opposite direction at said given speed, angle arm means having a first arm, a driver arm at an obtuse angle thereto and a pivot therebetween, means for rotating said angle arm means from said hollow shaft about the axis of said shaft and in a plane parallel to the axis of said pivot, an eccentric carried by said inner shaft adapted to engage said first arm of said angle arm means, said eccentric being displaced from said shaft axes to effect partial rotation of said angle arm means about said pivot relative to said hollow shaft, a first rod having a first end movable by said driver arm in a closed path on the surface of a reference sphere with the intersection of said pivot and shaft axes as the center of said sphere, said first rod being disposed generally perpendicular to both said shaft axes, a translatable second rod having an end and being disposed substantially perpendicular to both said shaft axes and in the plane of said pivot, gimbal rings interconnecting a second end of said first rod and said second rod to transform said spherical movement into a cylindrical movement, and a T bar carried by said end of said second rod substantially perpendicular thereto whereby one end of said T bar will produce a movement on the peripheral surface of a cylinder which movement is a closed path having opposite sides which are substantially parallel to the axis of the cylinder for a distance at least 25 percent of the axial length of said closed path.

11. A mechanical movement device comprising, means for establishing first and second intersecting reference axes, arm means at least partially pivotable about said second axis and disposed at an acute angle relative to said first axis, means for at least partially rotating said second axis and said arm means about said first axis, eccentric means rotating at substantially the same speed as said first means and having an axis substantially parallel to said first axis for at least partially pivoting said arm means about said second axis through a second acute angle, so that a point on siad arm means produces a path on a reference sphere, a portion of which is substantially contained within a diametral plane, and a link connected to said arm means at said point to transform said portion of the spherical path into a substantially straight line.

12. A mechanical movement device comprising, means for establishing first and second mutually perpendicular reference axes intersecting at a common point, arm means at least partially pivotable about said second axis and disposed at an acute angle relative to said first axis, means for at least partially rotating said second axis and said arm means about said first axis, means at least partially rotating said second axis and said arm means about said first axis, means at least partially revolving in the opposite direction relative to said rotating means and in synchronism therewith for pivoting said arm means about said second axis through a second acute angle, rod means translatable along and at least partially revoluble about a third axis, and linkage means interconnecting said arm means and said rod means.

13. A mechanical movement device comprising, means for establishing first, second and third intersecting reference axes with the first and third axes being mutually perpendicular, arm means at least partially pivotable about said second axis and disposed at an acute angle relative to said first axis, means for at least partially rotating said second axis and said arm means about said first axis, means at least partially revolving in the opposite direction relative to said rotating means and in synchronism therewith for pivoting said arm means about said second axis through a second acute angle, rod means translatable along and at least partially revoluble about said third axis, and linkage means including a pivotal connection for interconnecting said arm means and said rod means with the axis of said pivotal connection substantially perpendicular to said third axis.

14. A mechanical movement device for producing a a closed path movement on a reference sphere which path has an arcuate swing of a given angle in a given plane relative to said sphere, which has portions substantially contained in diametral planes of said sphere with the diametral planes spaced by said given angle, and which portions are substantially opposite each other with the portions being in the order of 35 percent of the longitudinal length of the path, said device comprising, means for establishing first and second perpendicular reference axes intersecting at the center of said sphere, said first axis being in said given plane, arm means at least partially pivotable about said second axis and disposed at an acute angle relative to said first axis, means for rotating said second axis and said arm means about said first axis, eccentric means revolving in the opposite direction relative to said rotating means and at the same rotational speed for pivoting said arm means about said second axis through a second acute angle, a point on said arm means describing said closed path movements, and said reference sphere having a radius in the order of 1.4d/sin (.78B), where d is the length of said portions, and B is said given angle.

15. A mechanical movement device for producing a closed path movement on a reference sphere which path has an arcuate swing of a given angle in a given plane relative to said sphere, which has portions substantially contained in diametral planes of said sphere with the diametral planes spaced by said given angle, and which portions are substantially opposite each other with the portions being in the order of 35 percent of the longitudinal length of the path, said device comprising, means for establishing first and second perpendicular reference axes intersecting at the center of said sphere, said first axis being in said given plane, arm means at least partially pivotable about said second axis and disposed at an acute angle relative to said first axis, said acute angle being in the order of 64 percent of said given angle, means for rotating said second axis and said arm means about said first axis, means revolving in the opposite direction relative to said rotating means and at the same rotational speed for pivoting said arm means about said second axis through a second acute angle, a point on said arm means describing said closed path movements, said second acute angle being in the order of 14 percent of said given angle, and said reference sphere having a radius in the order of 1.4d/sin (.78B), where d is the length of said portions, and B is said given angle.

16. A mechanical movement device for producing a closed path movement on a reference cylinder which path has an arcuate swing relative to said cylinder and which has substantially straight line portions substantially opposite each other with the portions being in the order of 35 percent of the longitudinal length of the path, said device comprising, means for establishing first and second reference axes intersecting the axis of said cylinder at a common point and said first reference axis and said cylinder axis being substantially mutually perpendicular, arm means at least partially pivotable about said second axis and disposed at an acute angle relative to said first axis, means for rotating said second axis and said arm means about said first axis, means revolving in the opposite direction relative to said rotating means and in synchronism therewith for pivoting said arm means about said second axis through a second acute angle, rod means translatable along and at least partially revoluble about the axis of said reference cylinder, linkage means including gimbal rings interconnecting said arm means and said rod means with said gimbal rings having axes substantially perpendicular to the axis of said cylinder, and a T bar carried by said rod means substantially perpendicular thereto and having an end on the surface of said reference cylinder for describing said closed path.

17. A mechanical movement device for producing a closed path movement on a reference cylinder which path has an arcuate swing of a given angle relative to said cylinder and which has substantially straight line portions substantially opposite each other with the portions being in the order of 35 percent of the longitudinal length of the path, said device comprising, means for establishing first and second reference axes intersecting the axis of said cylinder at a common point and said first reference axis and said cylinder axis being substantially mutually perpendicular, arm means at least partially pivotable about said second axis and disposed at an acute angle relative to said first axis, said acute angle being in the order of 64 percent of said given angle, means for rotating said second axis and said arm means about said first axis, means revolving in the opposite direction relative to said rotating means and in synchronism therewith for pivoting said arm means about said second axis through a second acute angle, said second acute angle being in the order of 14 percent of said given angle, rod means translatable along and at least partially revoluble about the axis of said reference cylinder, linkage means including gimbal rings interconnecting said arm means and said rod means with said gimbal rings having axes substantially perpendicular to the axis of said cylinder, said linkage means being connected to said arm means at a point spaced from said common point a distance in the order of 1.4d sin (.78B), where d is the length of said straight line portion, and B is said given angle, and a T bar carried by said rod means substantially perpendicular thereto and having an end on the surface of said reference cylinder for describing said closed path.

18. A mechanical movement device comprising an axle having an axis, an arm having a second axis intersecting said first axis and at least partially pivotable about said axle, means for rotating said axle in a plane containing said first axis and at an acute angle to said second axis such that a point on said arm generates a closed path on a reference sphere having the center thereof at the intersection of said axes, and linkage means including pivotal means to transform said spherical path into a path based upon a cylinder having its axis substantially parallel to said plane.

19. A mechanical movement device comprising an axle having an axis, an arm having a second axis intersecting said first axis and at least partially pivotable about said axle, means for rotating said axle in a plane containing said first axis and at an acute angle to said second axis, eccentric means synchronized with said first means to cylically and partially pivot said arm about said first axis such that a point on said arm generates a closed path on a reference sphere having the center thereof at the intersection of said axes which path is in other than a single plane, and linkage means including pivotal means to transform said spherical path into a cylindrical path based upon a cylinder having its axis substantially perpendicular to the axis of the pivotal means and passing through the center of said sphere.

20. A mechanical movement device comprising, a frame, first rotative means on said frame to establish a conical movement about a first axis such that a point on said rotative means defines a circular path on the surface of a reference sphere, second rotative means on said frame, said first and second rotative means rotating at a relative speed, one of which is a small integer times the other to flatten the opposite sides of said cone and circular path into an oblong path on said reference sphere, and linkage means on said frame to transform said oblong path on said sphere into an oblong path on a reference cylinder having a second axis perpendicular to said first axis.

21. A mechanical movement device comprising, a frame, first rotative means on said frame to establish a conical movement about a first axis such that a point on said rotative means defines a circular path on the surface of a reference sphere, and second rotative means on said frame interlinked with said first rotative means and rotatable about said first axis at the same speed and in the opposite direction to flatten the opposite sides of said cone and circular path into an oblong path on said reference sphere.

22. A mechanical movement device comprising, a frame, first rotative means on said frame to establish a conical movement about a first axis such that a point on said rotative means defines a circular path on the surface of a reference sphere, and linkage means on said frame to transform said path on said sphere into a path on a reference cylinder having a second axis perpendicular to said first axis.

23. A mechanical movement device comprising, a frame, first and second interlinked rotative means on said frame rotatable about a first axis at the same speed and opposite direction such that said first rotative means attempts to define a circular path on the surface of a reference sphere and said second rotative means modifies the action thereof to flatten the opposite sides of said circular path into an oblong path on said reference sphere.

24. A mechanical movement device comprising, a frame, first rotative means on said frame to establish a conical movement about a first axis such that a point on said rotative means defines a circular path on the surface of a reference sphere, linkage means on said frame to transform said path on said sphere into a path on a reference cylinder having a second axis perpendicular to said first axis, and second rotative means on said frame and acting on one of said first rotative means and linkage means to flatten the opposite sides of said path into an oblong path on said reference cylinder.

25. A mechanical movement device comprising, a frame, first rotative means on said frame to establish a conical movement about a first axis such that a point on said rotative means defines a circular path on the surface of a reference sphere, second rotative means on said frame rotatable about said first axis at the same speed and in the opposite direction to flatten the opposite sides of said cone and circular path into an oblong path on said reference sphere, and linkage means on said frame to transform said oblong path on said sphere into an oblong path on a reference cylinder having a second axis perpendicular to said first axis.

26. A mechanical movement device comprising, a frame, first and second rotative means on said frame rotatable about a first axis at the same speed and opposite direction such that said first rotative means attempts to define a circular path on the surface of a reference sphere and said second rotative means modifies the action thereof to flatten the opposite sides of said circular path into an oblong path on said reference sphere, and linkage means on said frame to transform said oblong path on said sphere into an oblong path on a reference cylinder having a second axis perpendicular to said first axis.

References Cited in the file of this patent

UNITED STATES PATENTS

| | | |
|---|---|---|
| 2,407,310 | Lundy | Sept. 10, 1946 |
| 2,437,275 | Skene | Mar. 9, 1948 |
| 2,439,262 | Nalbach | Apr. 6, 1948 |
| 2,528,963 | Looney | Nov. 7, 1950 |
| 2,574,376 | Childs | Nov. 6, 1951 |